(12) United States Patent
Boudreaux, Jr.

(10) Patent No.: US 7,076,055 B2
(45) Date of Patent: *Jul. 11, 2006

(54) TRACKING SWITCHMODE POWER CONVERTER FOR TELEPHONY INTERFACE CIRCUIT

(75) Inventor: Ralph R. Boudreaux, Jr., Madison, AL (US)

(73) Assignee: Adtran, Inc., Huntsville, AL (US)

( * ) Notice: Subject to any disclaimer, the term of this patent is extended or adjusted under 35 U.S.C. 154(b) by 343 days.

This patent is subject to a terminal disclaimer.

(21) Appl. No.: 10/684,725

(22) Filed: Oct. 14, 2003

(65) Prior Publication Data

US 2004/0076289 A1    Apr. 22, 2004

Related U.S. Application Data

(63) Continuation of application No. 09/427,348, filed on Oct. 26, 1999, now Pat. No. 6,668,060.

(51) Int. Cl.
*H04M 1/00* (2006.01)

(52) U.S. Cl. ............. 379/413; 379/399.01; 379/395.01

(58) Field of Classification Search ................ 379/413, 379/399.01, 395.01, 399.02, 400, 401, 402, 379/413.01, 413.02, 413.04, 390.04, 398
See application file for complete search history.

(56) References Cited

U.S. PATENT DOCUMENTS

| | | | |
|---|---|---|---|
| 3,949,172 A * | 4/1976 | Brown et al. ................ 455/402 |
| 4,405,976 A | 9/1983 | Mitchell et al. ............... 363/72 |
| 4,841,564 A | 6/1989 | Schoofs ........................ 379/413 |
| 5,289,359 A | 2/1994 | Ziermann ..................... 363/21 |
| 5,329,588 A | 7/1994 | Willocx et al. .............. 379/413 |
| 5,341,417 A * | 8/1994 | Hwang et al. .......... 379/399.02 |
| 5,347,544 A | 9/1994 | Garcia et al. ................ 379/413 |
| 5,396,194 A | 3/1995 | Williamson et al. ......... 330/297 |
| 5,483,197 A | 1/1996 | Nishioka et al. ............. 330/273 |
| 5,543,753 A | 8/1996 | Williamson .................. 330/297 |
| 5,633,925 A | 5/1997 | Handford et al. ........... 379/413 |
| 5,848,149 A | 12/1998 | Chen et al. .................. 379/413 |
| 5,960,075 A * | 9/1999 | Sutherland et al. .... 379/413.01 |
| 6,088,128 A | 7/2000 | Nishii et al. ................. 379/413 |
| 6,169,883 B1 | 1/2001 | Vimpari et al. ............... 379/27 |
| 6,212,226 B1 | 4/2001 | Newton ....................... 379/413 |
| 6,668,060 B1 * | 12/2003 | Boudreaux, Jr. ............. 379/413 |

* cited by examiner

*Primary Examiner*—Barry Taylor
(74) *Attorney, Agent, or Firm*—Allen, Dyer, Doppelt, Milbrath & Gilchrist, P.A.

(57) ABSTRACT

A comparator-based switchmode power converter monitors the most negative of the tip and ring line voltages, to control the supply voltage to a SLIC. The voltage applied to the SLIC's power terminals is slightly higher than the sensed voltage for different loop signaling conditions, including loop start, ground start balanced ringing. The switchmode converter includes a comparator coupled to a DC-DC output node downstream of a MOSFET switch installed in a DC supply rail of a source of DC supply voltage, and coupled to a power supply terminal of the SLIC. The comparator is also coupled to a set point node, which is coupled through a voltage offset path to each of tip and ring portions of the telephone line. The comparator functions to control the conductivity of the MOSFET to provide a modulated DC voltage to the SLIC, in accordance with that one of tip and ring loop voltages having the largest magnitude, so as to provide power supply tracking during loop current, superimposed voice signals, loop start, ground start and balanced ringing.

8 Claims, 2 Drawing Sheets

TRACKING SWITCHMODE POWER CONVERTER FOR TELEPHONY INTERFACE CIRCUIT

CROSS-REFERENCE TO RELATED APPLICATION

The present application is a continuation of U.S. patent application Ser. No. 09/427,348, filed Oct. 26, 1999, now U.S. Pat. No. 6,668,060 by Ralph R. Boudreaux, Jr., entitled: "Tracking Switchmode Power Converter For Telephony Interface Circuit", assigned to the assignee of the present application and the disclosure of which is incorporated herein.

FIELD OF THE INVENTION

The present invention relates in general to telecommunication systems and components therefor, and is particularly directed to a new and improved, reduced complexity switchmode power converter for controlling the voltage supplied to a subscriber line interface circuit in accordance with the sensed line voltage.

BACKGROUND OF THE INVENTION

In order to convey digital telecommunication signals over a traditional (plain old telephone service or POTS) telephone line, it is necessary to provide an interface between the source of the digital signals and the analog telephone line. This interface, customarily termed a subscriber line interface circuit or SLIC, is generally configured of one or more integrated circuits that support a number of functions including battery feed, overvoltage protection, ringing, supervision, hybrid and test (BORSHT). When a POTS phone is off-hook, the SLIC must be powered with a voltage that is high enough to ensure that the required DC loop current (typically on the order of 18–50 mA), upon which the voice signal is superimposed, is generated for maximum loop resistance (longest line). While this can be accomplished in a brute force manner by setting the voltage to a value based upon a maximum length line, doing so wastes power for a short line length application.

For example, supplying a loop current of 25 mA through a line having 1000 ohms total line resistance to a 500 ohm phone requires a minimum of 37.5 VDC at the line interface. A short line, on the other hand, operating at the same voltage (37.5 VDC) will waste power by dropping the excess voltage across the SLIC. In this example, for a reduced line resistance of only 100 ohms, over 500 mW of power would be needlessly dissipated in the SLIC circuitry. In order to reduce power consumption for short lines, vendors of SLIC ICs typically offer an IC with two power inputs. One is for use with a high voltage supply, the other for use with a low voltage supply. The SLIC automatically determines which supply rail to use depending on line conditions. Power is reduced for short line lengths by powering the line from the lower voltage source.

SUMMARY OF THE INVENTION

Pursuant to the present invention, this power consumption problem is substantially diminished by monitoring the line voltage, and using a reduced complexity switchmode power converter to control the voltage supplied to and therefore the voltage drop across the SLIC, so that the voltage applied to the SLIC's power terminals is slightly higher than the sensed voltage. The voltage margin or headroom across the SLIC is dependent upon the specifics of the SLIC circuitry and is typically on the order of 2–15 V. In accordance with a non-limiting, preferred embodiment, the reduced complexity switchmode power converter of the present invention is configured to provide power supply tracking during the SLIC's application of loop current and superimposed voice to the loop, and also during loop start, ground start and balanced ringing.

For this purpose, a comparator, which effectively functions as a pulse width modulator of the conductivity path through a MOSFET installed in the power supply rail to the SLIC, has a first input terminal coupled through a voltage divider to a 'DC-DC output' node, downstream of a MOSFET switch installed in a (−48V) DC supply rail. The comparator has a second input terminal coupled through a voltage divider to a 'set point' or reference node. The DC-DC output node is coupled through a post LC filter to the (−) DC power supply terminal of the SLIC. The set point node is coupled through a Zener diode and a buffer transistor to diodes that connect to the tip and ring lines of the loop, and thereby provide for tracking of the most negative of the tip and ring portions of the loop. The buffer transistor reduces loading on tip and ring and also removes the effect of the voltage drop through either diode. The Zener diode provides a prescribed DC voltage offset (e.g., −5V) between the set point node and the most negative of tip and ring, to give the SLIC headroom to operate.

The output of the comparator is coupled to the control gate of a MOSFET, having its source-drain path coupled in circuit with the DC power supply rail and an LC smoothing filter to the DC-DC output node. The comparator turns on the MOSFET and thereby couples the DC supply rail through the LC filter paths to the SLIC, when the DC-DC output node is less negative than the voltage at the set point node. In a complementary manner, when the DC-DC output node is more negative than the voltage at the set point node, the comparator turns the MOSFET off, and thereby decouples the supply rail from the LC filter paths to the SLIC.

DETAILED DESCRIPTION

Figure 1:
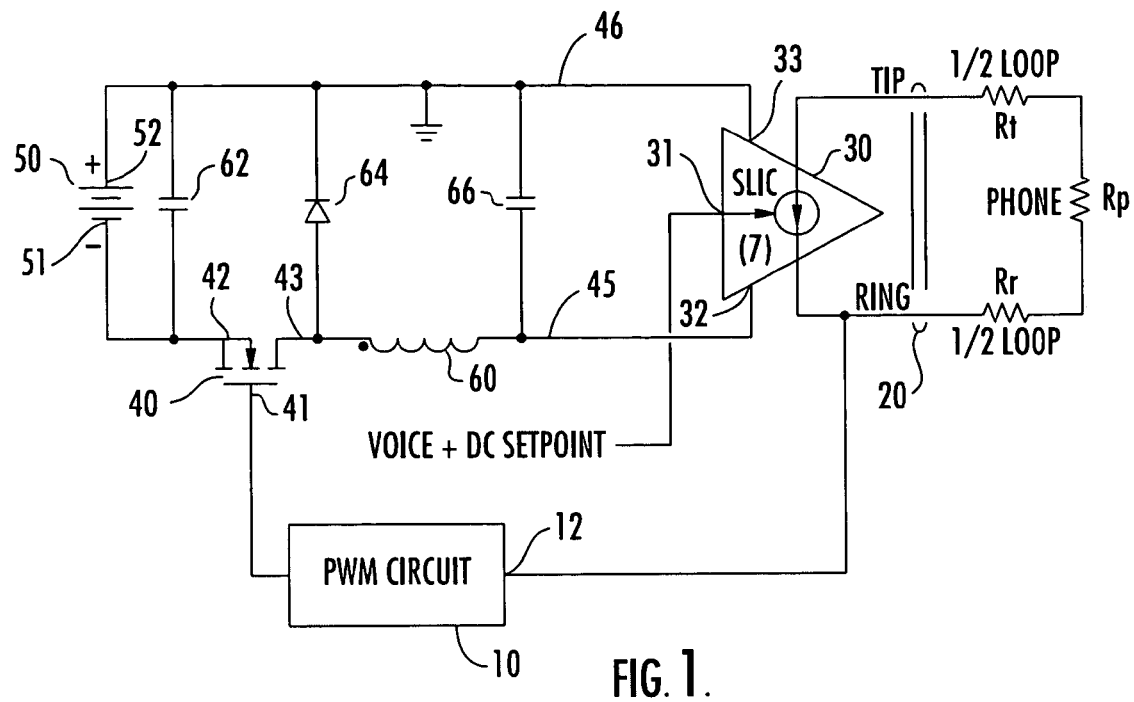
FIG. 1 is a diagrammatic illustration of a first embodiment of a switchmode power converter of the present invention.

A first embodiment of a switchmode power converter of the present invention is diagrammatically illustrated in FIG. 1 as comprising a pulse width modulator (PWM) circuit 10 having a sense input 12, which is coupled to monitor or sense the line voltage of one (e.g., Ring (R) of a tip/ring (T/R) loop pair 20, that are driven by a SLIC 30. The overall line resistance of the loop 20 is shown schematically by tip and ring resistances Rt and Rr, respectively, which form a closed loop circuit path with the resistance Rp of a phone terminating the loop.

SLIC 30 has a signalling input terminal 31 coupled to receive both signals and a prescribed DC loop current set point. The PWM circuit 10 is operative to generate a high frequency modulation waveform that is coupled to the control input (gate) 41 of an electronic switch, shown as a MOSFET 40, which is coupled in circuit with the DC power supply for the SLIC. PWM circuit 10 and MOSFET 40 form a switchmode power converter that is operative to actively modulate the DC power supply voltage to the SLIC in a manner that effectively follows the voltage drop across the POTS loop 20.

For this purpose, PWM circuit 10 generates a high frequency modulation waveform, which may have a frequency in a range on the order of 5–500 kHz, as a non-limiting example, and a variable characteristic that is effective to vary the duty cycle of conduction of the MOSFET switch 40 in accordance with the sensed line voltage. The duty cycle of the MOSFET switching may be changed by varying the off time while the on time is fixed (variable frequency), varying the on time while the off time is fixed (also variable frequency), or by varying both the on and off time (fixed or variable frequency).

The MOSFET switch 40 has its source-drain 42–43 path coupled in circuit to a first (−) DC power terminal 32 of the SLIC 30 with a first power supply path 45 that includes a first (−) terminal 51 of a DC power supply 50 (providing a voltage $V_{50}$) and an inductor 60. A second power supply path 46 from a second (+) terminal 52 of the DC power supply 50, which is shown as being coupled to ground, is coupled to a second (+) DC power terminal 33 of the SLIC 30. A capacitor 62 is coupled across power supply paths 45–46 to decouple the high frequency ripple generated by the switching operation of the MOSFET 40 from the DC power supply 50. A diode 64 is coupled across power supply paths 45–46 to clamp the voltage induced by the inductor 60 during the off time of the MOSFET 40, so as to provide an efficient transfer of stored inductive energy. A capacitor 66 is coupled across the input supply terminals 32 and 33 of the SLIC and forms an LC smoothing filter with the inductor 60, in order to smooth square wave pulses produced by the switching operation of the MOSFET 40 and provide a relatively 'clean' DC power voltage across the supply voltage terminals 32 and 33 of the SLIC.

In operation, in order to provide power supply tracking during the SLIC's application of loop current and superimposed voice to the loop, the PWM circuit 10 monitors the line voltage (here sensing the voltage on the ring portion of the loop), and generates a variable waveform that modulates the conductivity path through the MOSFET switch 40. The parameters of the PWM circuit 10 are such that the effective DC voltage smoothed by the LC filter (inductor 60 and capacitor 66) to the power terminals 32–33 of the SLIC 30 is only slightly higher than the sensed voltage, thereby minimizing unnecessary (wasted) power consumption in the SLIC. As pointed out above, the voltage margin or headroom across the SLIC 30 is dependent upon the specifics of the SLIC's internal circuitry and may be on the order of 2–15 volts, as a non-limiting example.

Figure 2:
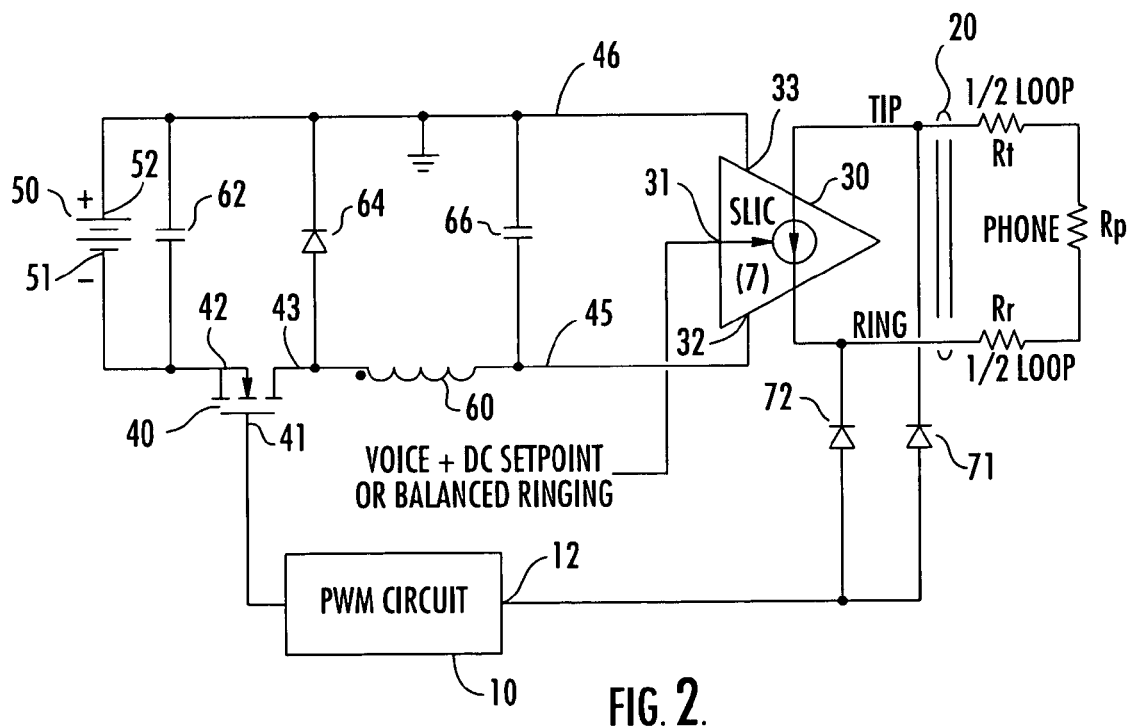
FIG. 2 is a diagrammatic illustration of a second embodiment of a switchmode power converter of the present invention.

FIG. 2 shows a diagrammatic illustration of a second embodiment of a switchmode power converter of the present invention, in which the embodiment of FIG. 1 is modified to provide power supply tracking during balanced ringing. During a balanced ringing condition (e.g., at 20 Hz, as a non-limiting example), the SLIC will alternately drive the tip and ring portions of the loop 20 between the power rail ($-V_{50}$) and ground, with tip and ring being 180° out of phase. This imposes a (20 Hz) ringing waveform on the line that has twice the peak-to-peak voltage of the power supply 50.

Since the voltage transition on tip or ring is generally controlled by the SLIC 30 to minimize ramp time, it would be beneficial for the power supply to track the output as its slews up and down (between its opposite polarity supply rail extremes). As shown in FIG. 2, this is accomplished by controlling the operation of the PWM circuit 10 in accordance with the greater magnitude of tip and ring. In particular, the sense input 12 of PWM control circuit 10 is coupled through respective diodes 71 and 72 to the tip and ring lines of the loop 20. This modification allows the PWM circuit 10 to track the most negative of tip and ring.

Figure 3:
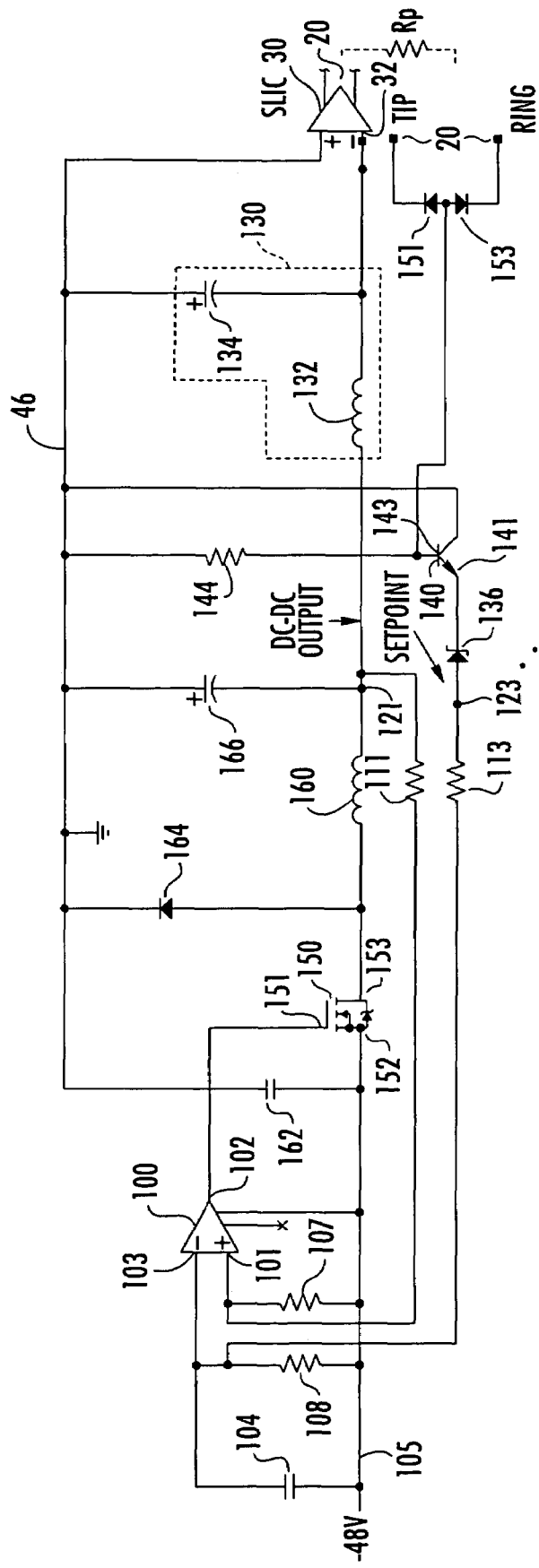
FIG. 3 is a schematic diagram of a non-limiting but preferred implementation of the embodiment of the switchmode power converter shown in FIG. 2.

A preferred, non-limiting implementation of the balanced ringing embodiment of the switchmode converter-based SLIC power supply of FIG. 2 is schematically illustrated in FIG. 3 as comprising a comparator 100 having first (+) and second (−) input terminals 101 and 103, respectively. As will be described, the comparator 100 effectively functions as a pulse width modulator of the conductivity path through a MOSFET installed in the power supply rail to the SLIC, and thereby provides a relatively simple and inexpensive mechanism for modulating the SLIC's supply voltage.

The first (+) input terminal 101 of the comparator 100 is coupled to a voltage divider comprised of a resistor 107 to rail 105 and a resistor 111. The resistor 111 is coupled to a 'DC-DC' output node 121. The second input terminal 103 is coupled is coupled through a high frequency decoupling capacitor 104 to a (−48V) DC supply rail 105 and to a voltage divider comprised of a resistor 108 to rail 105 and a resistor 113. The resistor 113 is coupled to a 'set point' node 123.

The DC-DC output node 121 is coupled through a post filter 130 comprised of an inductor 132 and a capacitor 134 to the (−) DC power supply terminal 32 of the SLIC 30. The set point node 123 is coupled through a Zener diode 136 to the emitter 141 of an NPN bipolar buffer transistor 140. The base 143 of transistor 140 is coupled through diodes 151 and 153 to the tip and ring lines of the loop 20, to provide for tracking of the most negative of the tip and ring portions of the loop 20. The base 143 of transistor is also coupled through a base bias resistor 144 to the ground reference supply rail 46, while its collector 145 is coupled directly to the ground reference supply rail.

Transistor 140 provides an active buffer function between the anodes of the diodes 151 and 153 through which the loop is monitored; it reduces the loading on tip and ring and also removes the effect of the voltage drop through either diode. Zener diode 136 serves to provide a prescribed DC voltage offset between the set point node 123 and the most negative of tip and ring. As a non-limiting example, Zener diode 136 may provide a −5V offset of the set point 123 relative to tip and ring, to provide the SLIC 30 with a voltage on the order of 10V of headroom to operate.

(It should be noted that the buffer transistor 140 may not be necessary in all applications, for example, if the divider resistors are of relatively high impedance. Also, the offset imparted by the Zener diode may be implemented using other components, such as reference diodes or even a simple resistor. In the case of a resistor the offset will vary with line voltage.)

Comparator 100 has its output 102 coupled to the control input (gate) 151 of a MOSFET 150, the source-drain path 152–153 of which is coupled in circuit with the (−48V) DC power supply rail 105 and an inductor 160 in a circuit path to the DC-DC output node 121. A capacitor 162 is coupled between the source 152 of the MOSFET 150 and ground to decouple the high frequency ripple generated by the switching operation of the MOSFET 150 from the DC power supply rail 105. A diode 164 is coupled between the drain 153 of MOSFET 150 and ground to clamp the voltage induced by the inductor 160 during the off time of the MOSFET 150, and provide an efficient transfer of stored inductive energy. A capacitor 166 is coupled between the DC-DC output node 121 and ground and forms an LC smoothing filter with the inductor 160, to smooth square wave pulses produced by the switching operation of the MOSFET 150 and provide a relatively clean DC power voltage at the DC-DC output node 121. This DC output voltage is further filtered by post LC smoothing filter 130, referenced above. (The post LC filter may not be necessary in all implementations, depending on the attenuation of the first filter and the ability of the SLIC being used to reject switching noise.)

The operation of the embodiment of FIG. 3 is similar to that of FIG. 2, with the on/off switching operation (or PWM) of the MOSFET 150 being controlled in accordance with the greater magnitude (more negative) of tip and ring. In particular, the comparator 100 turns on the MOSFET 150 and thereby couples the −48V supply rail through the LC filter paths to the SLIC, when the DC-DC output node 121 is less negative than the voltage at the set point node 123. In a complementary manner, when the DC-DC output node 121 is more negative than the voltage at the set point node 123, the comparator 100 turns the MOSFET 150 off, and thereby decouples the −48V supply rail 105 from the LC filter paths to the (−) terminal 32 of the SLIC 30.

As will be appreciated from the foregoing description, the switchmode power converter of the present invention serves to effectively reduce the above-discussed power consumption problem of a conventional SLIC power supply, not only during the SLIC's application of loop current and superimposed voice to the loop, but also for loop start, ground start and during balanced ringing. By monitoring the most negative of the tip and ring line voltages, and using a comparator and a MOSFET switch to control the supply voltage to and therefore the voltage drop across the SLIC, the voltage applied to the SLIC's power terminals is controlled so as to be only slightly higher than the sensed voltage for each loop signaling condition.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A circuit for supplying DC power voltage to a telephone line interface circuit coupled to respective loop portions of a telephone line comprising:
   input terminals adapted to be coupled across a source of DC supply voltage;
   output terminals adapted to be coupled to power supply terminals of said telephone line interface circuit; and
   a switchmode converter circuit coupled with said input and output terminals and having a voltage sense input coupled to said respective loop portions of said telephone line, and being operative to provide a modulated DC voltage to said power supply terminals of said telephone line interface circuit, in accordance with whichever of said respective loop portions of said telephone line has the largest magnitude voltage, as sensed by said voltage sense input, so as to provide power supply tracking during application by said telephone line interface circuit to said telephone line of at least one of loop current, superimposed voice signals, loop start, ground start and balanced ringing.

2. The circuit according to claim 1, wherein said switchmode converter comprises a comparator having first and second inputs, said first input being coupled to a DC-DC output node downstream of a switch installed in a DC supply rail of said source of DC supply voltage, said DC-DC output node being coupled to a power supply terminal of said telephone line interface circuit, and a second input coupled to a set point node, said set point node being coupled through a voltage offset path to each of said respective loop portions of said telephone line.

3. The circuit according to claim 2, wherein said voltage offset path includes a voltage offset device coupled via respective diodes to tip and ring loop portions of said telephone line.

4. The circuit according to claim 2, further including at least one smoothing filter circuit coupled in a circuit path that includes said DC-DC output node.

5. The circuit according to claim 1, wherein said telephone line interface circuit is operative to interface digital signals with said telephone line.

6. A circuit for supplying DC power voltage to a subscriber line interface circuit (SLIC) coupled to respective tip and ring portions of a telephone line comprising:
   first and second input terminals adapted to be coupled across a source of DC supply voltage;
   first and second output terminals adapted to be coupled to power supply terminals of said SLIC; and
   a switchmode power converter circuit coupled to said first and second input terminals and to said first and second output terminals, and having a voltage sense input coupled to said respective tip and ring portions of said telephone line, and being operative to supply a prescribed DC supply voltage to said power supply terminals of said SLIC relative to the voltage level of one of said respective tip and ring portions of said telephone line as sensed by said voltage sense input during application to said telephone line of balanced ringing signals by said SLIC.

7. The circuit according to claim 6, wherein said switchmode converter comprises a comparator having first and second inputs, said first input being coupled to a DC-DC output node downstream of a MOSFET switch installed in a DC supply rail of said source of DC supply voltage, said DC-DC output node being coupled to a power supply terminal of said SLIC, and a second input coupled to a set point node, said set point node being coupled through a voltage offset path to each of said respective tip and ring portions of said telephone line.

8. A circuit for supplying DC power voltage to a subscriber line interface circuit (SLIC) coupled to respective tip and ring portions of a telephone line comprising:
   first and second input terminals adapted to be coupled across a source of DC supply voltage;
   first and second output terminals adapted to be coupled to power supply terminals of said SLIC; and
   a switchmode power converter circuit coupled to said first and second input terminals and to said first and second output terminals, and being operative to supply a prescribed DC supply voltage to said power supply terminals of said SLIC relative to the voltage level of one of said respective tip and ring portions of said telephone line, said switchmode converter comprising a comparator having first and second inputs, said first input being coupled to a DC-DC output node downstream of a MOSFET switch installed in a DC supply rail of said source of DC supply voltage, said DC-DC output node being coupled to a power supply terminal of said SLIC, and a second input coupled to a set point node, said set point node being coupled through a voltage offset path to each of said respective tip and ring portions of said telephone line.

* * * * *